(12) United States Patent
Moser et al.

(10) Patent No.: US 6,185,976 B1
(45) Date of Patent: Feb. 13, 2001

(54) METHOD FOR ADJUSTING A DIAPHRAGM SPRING

(75) Inventors: Dieter Moser, Gaggenau (DE); Rui P. Gabriotti, Sorocaba (BR)

(73) Assignee: Luk Lamellen und Kupplungsbau GmbH, Buhl/Baden (DE)

(*) Notice: Under 35 U.S.C. 154(b), the term of this patent shall be extended for 0 days.

(21) Appl. No.: 09/147,775

(22) PCT Filed: Jun. 29, 1998

(86) PCT No.: PCT/DE98/01852
§ 371 Date: Sep. 15, 1999
§ 102(e) Date: Sep. 15, 1999

(87) PCT Pub. No.: WO89/00606
PCT Pub. Date: Jan. 7, 1999

(30) Foreign Application Priority Data

Jun. 27, 1997 (DE) .............................. 197 27 280

(51) Int. Cl.$^7$ .................................................. B21K 29/00
(52) U.S. Cl. ........................................ 72/342.1; 29/869.91
(58) Field of Search .............................. 72/342.1; 29/173, 29/896.91; 148/580, 643

(56) References Cited

U.S. PATENT DOCUMENTS

| 3,750,251 | * | 8/1973 | Pugh et al. ................... 29/896.91 |
| 5,588,200 | * | 12/1996 | Schudel ........................ 29/603.01 |
| 5,769,973 | * | 6/1998 | Smith, Jr. ........................ 148/580 |

FOREIGN PATENT DOCUMENTS 60-121217 * 6/1985 (JP) ...................................... 29/173

* cited by examiner

Primary Examiner—Lowell A. Larson
(74) Attorney, Agent, or Firm—Darby & Darby

(57) ABSTRACT

A method of adjusting the axial height of the fingers of a diaphragm spring has the following steps:
  a) a localized area or portion of each finger is heated, and
  b) the sections of the finger that are adjacent to the heated are bent relative to each other so that the fingers obtain the desired axial height.

The heating substantially eliminates the introduction of bending stresses into the fingers.

23 Claims, 5 Drawing Sheets

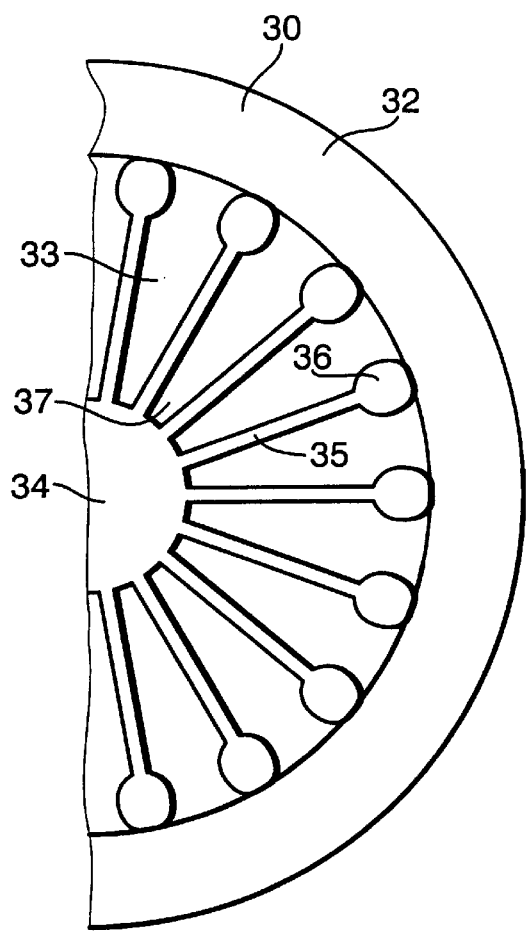 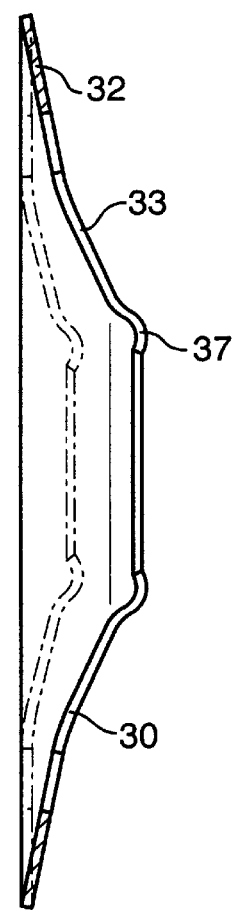
Fig. 5    Fig. 6
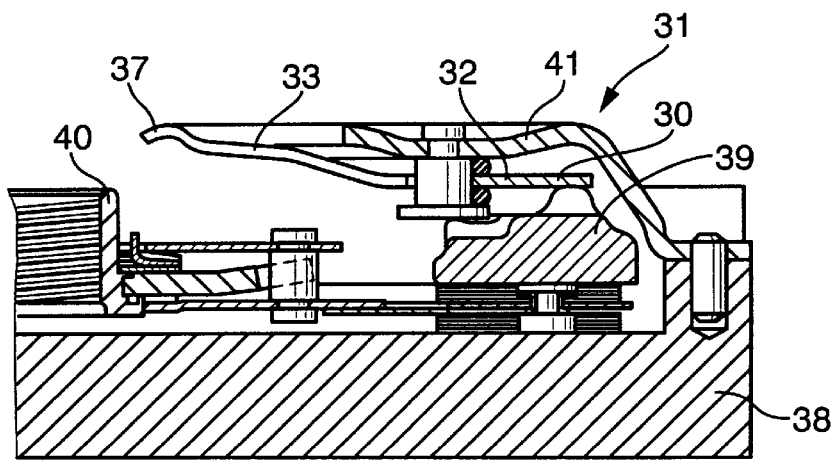
Fig. 7

METHOD FOR ADJUSTING A DIAPHRAGM SPRING

The invention relates to a method for adjusting a diaphragm spring, more particularly for adjusting the axial height and/or path of the tips of a diaphragm spring.

Diaphragm springs of this kind are known for example from DE OS 34 28 001, DE OS 33 04 670, U.S. Pat. No. 3,977,504 andU.S. Pat. No. 3,951,393. With diaphragm springs or plate springs which are provided in active engagement in a friction clutch between the housing and contact pressure plate it is already known to adjust the radially inwardly directed tongues of the plate spring which is installed in the friction clutch individually by means of a device which has a number of movable rams in order to bring the radially inner tongue tips at least approximately to the same axial height. The introduction of the operating force into the friction clutch by means of a disengagement bearing can thereby be significantly improved whereby the function and degree of efficiency of the friction clutch as well as of the disengagement system associated therewith can be significantly improved. More particularly the operating path required for the friction clutch can thereby be reduced. Furthermore a more even strain on the various component parts of the friction clutch and disengagement system is also achieved. More particularly it is also possible to avoid inadmissible high canting force on the disengagement bearing and thus on the disengagement member. Such canting is disadvantageous particularly in the case of disengagement members which can be axially moved on a guide tube on the gearbox side since through such canting the operating force is increased and the wear on the guides significantly increased. Furthermore through the more even force introduction which takes place over the circumference in the area of the tongue tips it is possible to avoid distortion or lateral impact of the plate spring, more particularly in the area of its radially outer ring-shaped foundation body.

The object of the present invention is to provide a simple cost-effective adjustment of the path of at least one or individual fingers of a diaphragm spring or a matching of the relative path of at least individual fingers relative to each other and/or the adjustment of the height of at least the free end areas of individual fingers of a diaphragm spring in a simple and cost-effective manner. Furthermore the invention is to guarantee a particularly simple and cost-effective construction of the device which is required for adjusting or aligning at least some individual fingers of a diaphragm spring.

According to a variation of the invention this is achieved in that at least one finger of the diaphragm spring is heated in a predetermined area so that this area and/or sections of the finger adjoining this area can be aligned without significant or practically without any elastic deformation. The partial heating of the finger can thereby take place so that an area located between the end areas of the finger is heated correspondingly so that the sections of the finger provided either side of this area can be aligned relative to each other whereby even the free end area of the corresponding finger can be brought to a defined axial position relative to the longitudinal axis of the diaphragm spring. It is however also possible only to heat and adjust the free end areas or finger tips. Furthermore at least two areas or zones of at least one finger can be heated in order to adjust same. The areas can thereby be heated simultaneously or staggered in time. Thus for example an intermediate area and the finger tips can be heated. Through a rapid cooling it is possible to harden at least in part at least one of these areas.

According to a variation of the invention the at least one finger of a diaphragm spring which is to be adjusted can first be stressed to bending and then at least the tensions produced thereby in the finger can be at least reduced by heating an area of the tensioned finger. Through heating at least the elastic tension of the finger is reduced or even practically completely removed.

Advantageously the heated area can be cooled down after the adjustment of the at least one finger so that at least a partial hardening is again produced in this area.

A method according to the invention can be used particularly in the case of diaphragm springs or plate springs which have already been thermally finished with regard to their spring properties prior to the alignment of at least one finger, preferably several or even of all fingers ※ where applicable apart from a tempering and/or hardening of the finger tips –.

In order to ensure after the adjustment process when the fingers are relaxed that there is only the smallest possible or practically no spring back or resetting of the fingers or finger sections it is expedient if through the heating in the deformation area of the individual fingers at least in areas the material strength is reduced to a very low value compared with the strength present in the other areas of the corresponding finger. The material strength in the heated deformation area is thus to be reduced at least in areas to 0 $N/mm^2$.

Advantageously the diaphragm spring can be at least partially radiated prior to the alignment of the fingers relative to each other. The zones of the fingers to be heated can be positioned so that at least a partial heat setting of the diaphragm takes place. This heat setting is due to the heat which radiates out from the heated areas as a result of the conductivity of the material and into the elastically deformable or resilient areas of the diaphragm spring. These areas can be formed for example through a ring-shaped foundation body of a plate spring.

Advantageously the method can be used in the case of plate springs which have a ring-shaped foundation body serving as energy accumulator and which has integral fingers e.g. in the form of tongues formed on its radially inner and/or on its radially outer circumferential area. These fingers can extend radially and/or circumferentially. Advantageously a plate spring of this kind or at least its ring-shaped foundation body can be set up conically in the untensioned state. It can thereby be particularly expedient if radially inwardly pointing tongues are formed on the foundation body and are separated from each other by radially aligned recesses such as slits.

Advantageously for the mutual alignment of the fingers all the fingers can be heated targeted in a predetermined area, thus in a restricted zone, and deformed jointly. Particularly in the case of plate springs to be used in connection with friction clutches it can be particularly expedient if through the alignment of the extension arms or tongues at least the free end areas thereof come to lie at least approximately in one plane perpendicular to the axis of rotation of the diaphragm spring or plate spring or tough such a plane. In many cases it can however also be advantageous if at least individual fingers have at least over a partial area of their longitudinal extension a path off-set relative to the remaining fingers whereby this path can be produced or corrected with the method according to the invention.

Particularly in the case of plate springs installed in friction clutches and having radially inwardly directed tongues whose tongue tips are biased axially by an operating means such as a disengagement bearing, it is particularly advantageous if these tongue tips are brought at least approximately to the same axial height through the alignment process according to the invention.

For the method according to the invention it is expedient if the finger areas to be heated are heated to a temperature between 600 and 950 degs., preferably to a temperature in the order of about 850 degs. The aforementioned temperatures are to be considered in connection with diaphragm springs which are made of steel. Higher or lower temperatures can however also be expedient depending on the type of material.

The methods according to the invention can be used both on the diaphragm spring itself, thus on the individual component part, and for diaphragm springs which are each installed in a structural unit, such as for example in a friction clutch. When using diaphragm springs of this kind in friction clutches the latter can be fitted complete or however also only in part when using the corresponding method. Thus for example the diaphragm spring can be connected only for swivel movement with the clutch housing. It is however particularly advantageous if the corresponding method is used in the case of completely fitted friction clutches. It is thereby particularly advantageous if during the adjustment process the diaphragm spring or the plate spring has a tensioned position which corresponds at least approximately to that position which the spring occupies when the clutch is installed in the vehicle. This can arise through positioning the pressure disc accordingly relative to the housing since the plate spring is thereby tensioned.

Advantageously the areas to be heated can be warmed inductively. The inductive heating can thereby take place with a rotating work piece and/or rotating coil. The coil thereby produces a magnetic alternating field through which vortex currents are induced in the work piece which cause a rapid rise in temperature. However a so-called burner heating can also be used, thus heating by means of a flame.

It can be particularly expedient if at least two coils are provided whereby the one heats the areas for aligning the fingers and the other serves to heat and harden the free finger tips. Through a very rapid cooling down or quenching in the area of the finger tips it is possible to produce a hardness which lies above that which exists in the remaining areas of the fingers and/or the entire diaphragm spring.

The invention will now be described in further detail with reference to the drawings and in connection with a possible execution and application of the invention.

In the drawings:

FIGS. 5 to 7 show a plate spring which in FIG. 7 is installed in a friction clutch.

Figure 1:
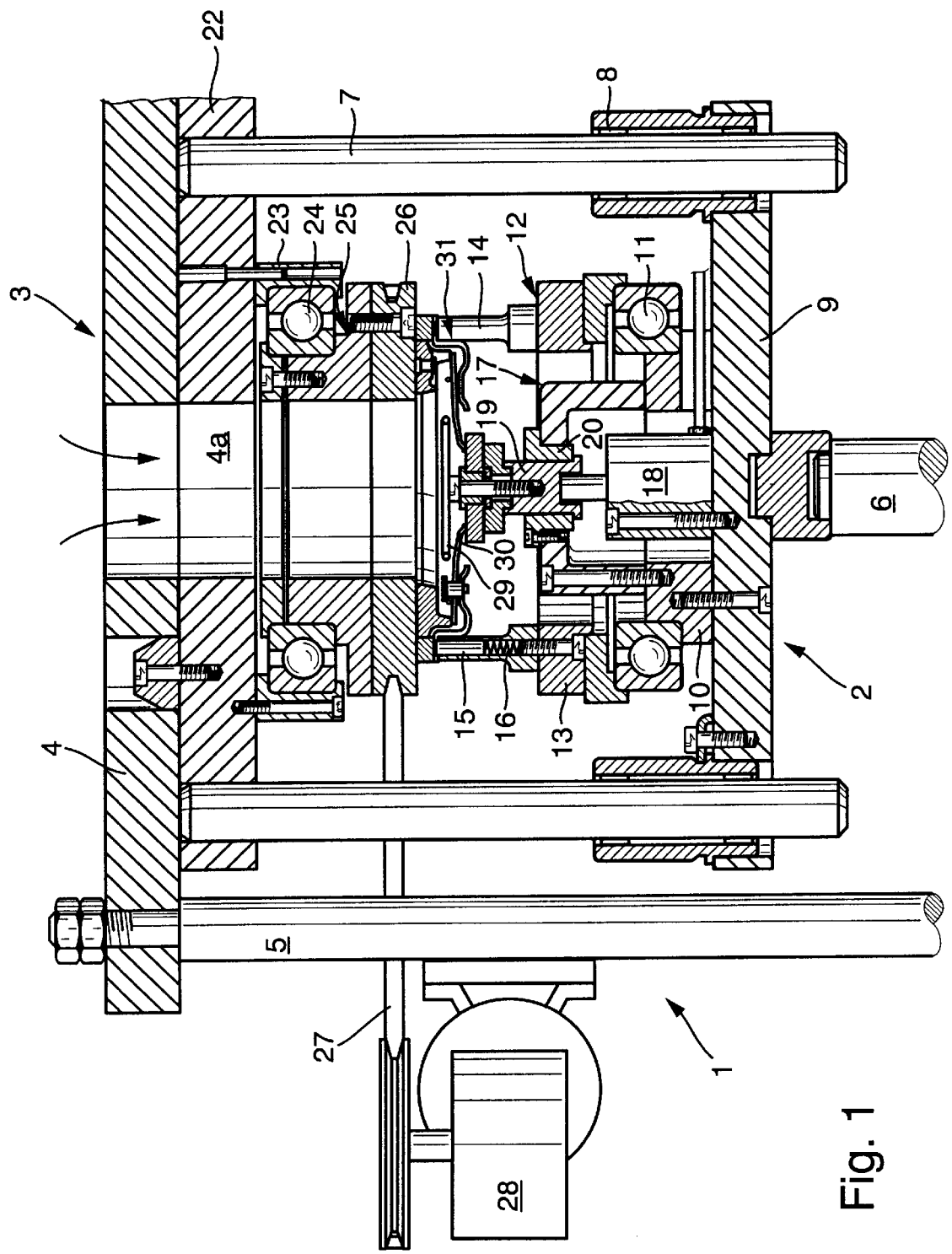
FIG. 1 is a sectional view through a device for carrying out the method.

As can be seen from FIG. 1 the device 1 for carrying out the method according to the invention consists of a lower part 2 and an upper part 3 or vice versa, which are housed in a frame which is closed per se but is not shown complete. Of the frame a part of the upper plate 4 is shown which is connected by a tie rod 5 to a lower plate (not shown). The upper part 3 is fixed on the upper plate 4. The lower part 2 is axially displaceable relative to the upper part 3 through a drive, such as for example a hydraulic cylinder 6 of which only the piston rod can be seen. The lower part 2 and upper part 3 are connected or guided rotationally secured but axially displaceable relative to each other through guide columns 7 and guide sleeves or guide bearings 8. The lower part 2 has a socket plate 9 which can be biased through the hydraulic cylinder 6 and supports the guide bearing 8. A bearing locator ring 10 is provided on the socket plate 9 and is axially supported on the socket plate 9 to hold a bearing 11 here in the form of a ball bearing –. A socket device 12 is supported by the bearing 11 on the socket plate 9. The socket device 12 is rotatable relative to the socket plate 9 through the bearing 11. With the illustrated embodiment the socket device 12 consists of at least one ring-shaped ring 13 which supports several tension elements in the form of tension bolts 14 spread out over the circumference. At least some individual tension bolts house centring means in the form of centring pins 15 which can be axially sunk, at least in part, preferably into the tension bolts, namely each against the action of an energy accumulator which can be formed for example through a coil spring 16. On the socket plate 9 or on the bearing locator ring 10 is furthermore an adjustment device 17 which has an adjustment cylinder 18 which can axially displace or bias an adjustment ram 19 which in the present case consists of several composite component parts. The adjustment ram 19 is axially displaceable in a guide socket 20 which here likewise consists of several composite component parts and is guided without or practically without any possibility of tilting. The guide socket 20 has a pot-shaped component part 21 which engages over or holds at least in part the adjustment cylinder 18 and is fixedly connected to the socket plate 9.

The upper part 3 likewise has a socket plate 22 on which a bearing locator ring 23 is fixed which supports a bearing in the form of a rolling bearing 24. A support device 25 which consists of several discs or rings is axially supported by the bearing 24 on the socket plate 22 and is mounted rotatable relative to same. The bearings 11 and 24 are mounted coaxial with each other so that the socket device 12 and the support device 25 can also rotate coaxial relative to each other. With the illustrated embodiment the support device 25 has a belt pulley 26 which can rotate through a belt 27 and drive motor 28. The device 1 furthermore has a heating or warming device 29 which serves for the at least partial heating up of the fingers of a component part, such as in particular a diaphragm spring, whereby through the interaction of the heating device and the remaining component parts of the device 1 an alignment of the fingers becomes possible as will be described below in further detail.

With the illustrated embodiment the heating device consists of a ring-shaped induction coil 29.

The device 1 serves for aligning the individual fingers of a diaphragm spring relative to each other wherein in the present case this diaphragm spring is formed by the plate spring 30 of a friction clutch 31. As can be seen from FIGS. 5 to 7 the plate spring 30 has a ring-shaped foundation body 32 from which extend radially inwardly aligned tongues 33 which define a central recess 34. The individual plate spring tongues 33 are separated from each other through slits 35 which connect radially inside with the central recess 34 and open radially outside into hole-like expansions 36 which adjoin the ring-shaped foundation body 32.

In FIG. 6 the position of the plate spring 30 shown by solid lines corresponds to the fully relaxed state of this plate spring. In the illustrated embodiment the plate spring tongues 33 are angled or bent and the radially inner tongue tips 37 are formed rounded.

As can be seen from FIG. 7 the friction clutch 31 can be mounted on a counter pressure disc such as a flywheel 38 whereby the friction linings of a clutch disc 40 can be clamped between the counter pressure disc 38 and the pressure disc 39 of the friction clutch 31. The pressure disc 39 is in known way biased by the plate spring 30. The plate spring 30 is mounted to swivel in known way on the clutch housing 41, namely in the illustrated embodiment in the manner of a double-armed lever. Friction clutches of this kind are known for example from U.S. Pat. No. 5,301,782 and DE OS 443 4019. The invention can however also be used in so-called pull-type clutches as known for example through U.S. Pat. No. 4,909,370 and DE OS 4237623.

Figure 2:
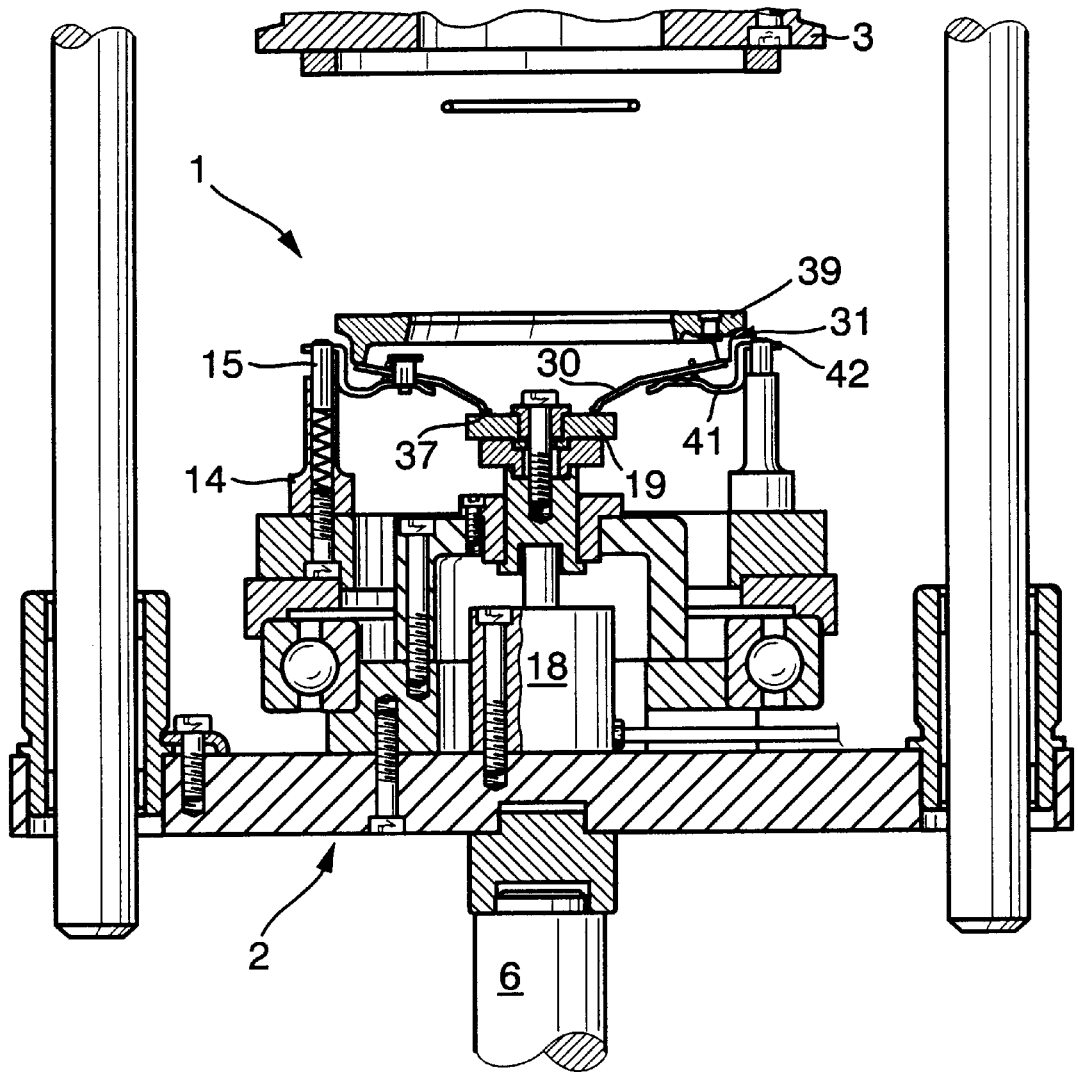
FIGS. 2 to 4 show individual phases of the method and process sequence.
Figure 3:
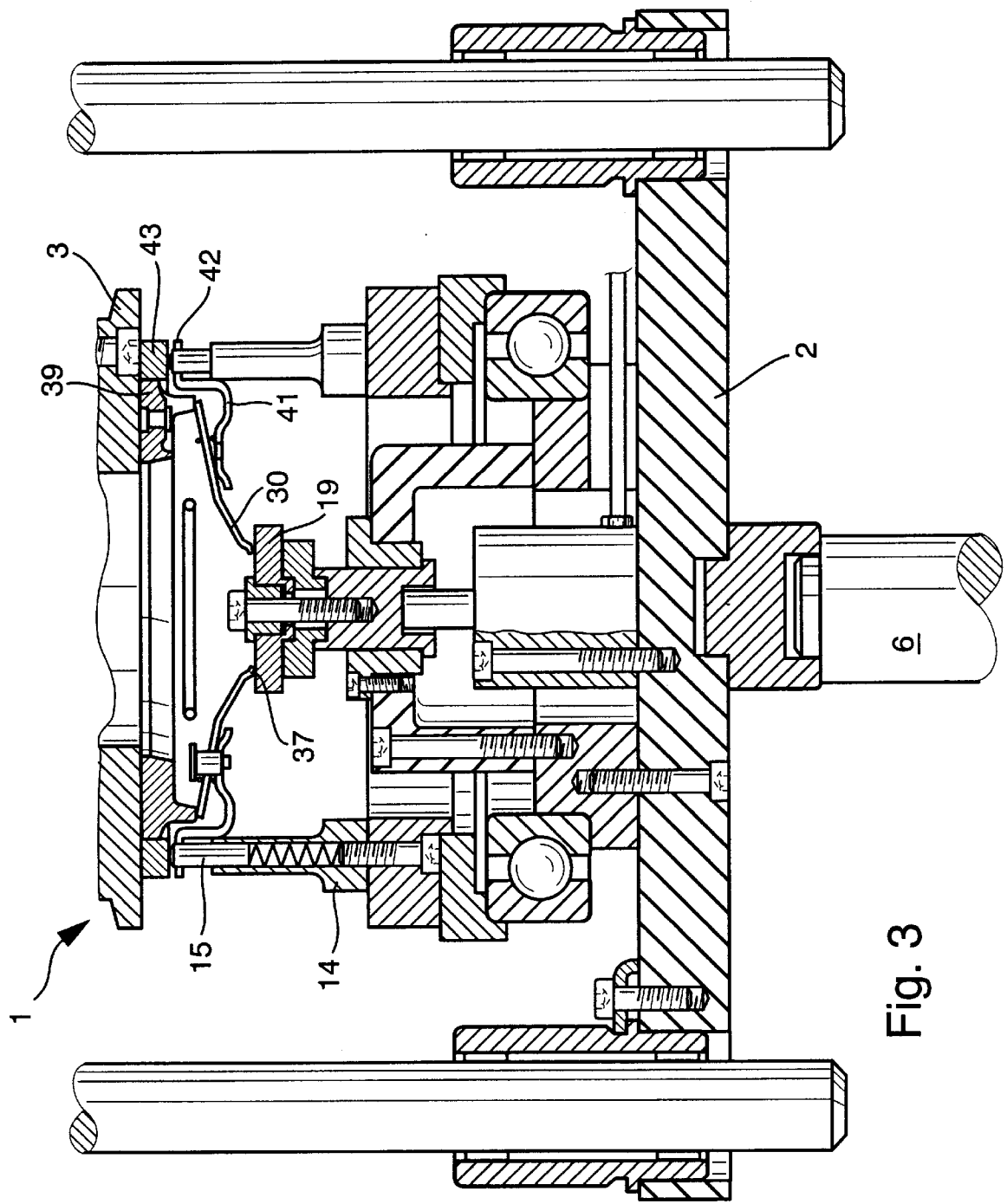

The method or process sequence for adjusting a plate spring which is already mounted in a friction clutch will now be described with reference to FIGS. 2 to 4.

In the first phase the friction clutch consisting of at least the pressure disc 39, plate spring 30 and housing 41 is installed in the device 1. With the illustrated embodiment the friction clutch is housed with the upwardly pointing pressure disc 39 in the device 1 wherein in the illustrated embodiment the tongue tips 37 are supported axially on the adjustment ram 19. The radial positioning or centring of the friction clutch 31 is carried out in the illustrated embodiment through the clutch housing 41 which has on its outer edge 42 recesses in which the centring pins 15 axially engage. It is expedient if at least two centring pins 15 are provided. However several centring pins can also be provided wherein it can be advantageous if three such centring pins are provided which as already described are housed axially displaceable in the tension elements in the form of tension bolts 14. The number of tension elements 14 should amount to at least three whereby it can be advantageous if 6 such tension elements are provided which can be spread evenly over the circumference.

After the friction clutch 31 has been housed in the device 1 the lower part 2 is moved upwards by means of the drive or hydraulic cylinder 6 whereby first the pressure disc 36 and the centring pins 15 come to adjoin the upper part 3. The bearing of the individual component parts 39, 15 against the upper part 3 can thereby take place practically at the same timer or staggered in time. The corresponding position is shown in FIG. 3. As the lower part 2 moves further upwards the centring pins 15 project axially into the corresponding tension elements 14 whereby after passing through a certain path these tension elements 14 come to adjoin the clutch housing or clutch cover 41. At least then the housing 41 is moved axially in the direction of the fixed pressure disc namely so long until this housing 41 comes to adjoin an adjustment element in the form of an adjustment ring 43 supported by the upper part 3. The outer edge area 42 of the housing 41 is then tensioned between the ring 43 and the tension elements 14. This position is shown in FIG. 4.

It should be noted that the sequences described above can take place with adjustment cylinders 18 and adjustment rams 19 fully extended to the desired position. In this case as the lower part 2 moves up as soon as the pressure disc 39 is axially supported on the upper part 3 the plate spring 30 is swivelled, namely because this is radially outwardly supported on the then axially fixed pressure disc 39 and is biased radially inwards in the area of the tongue tips 37 by the adjustment ram 19. According to another variation however the adjustment cylinder 18 or adjustment ran 19 can also be located in a retracted position as the lower part 2 moves up and the adjustment cylinder 18 and adjustment ram 19 are only brought into the desired axial position after the lower part 2 and upper part 3 are brought together. A path and/or force measurement can thereby take place at the same time which allows conclusions to be drawn on the operating state of the friction clutch.

Figure 4:
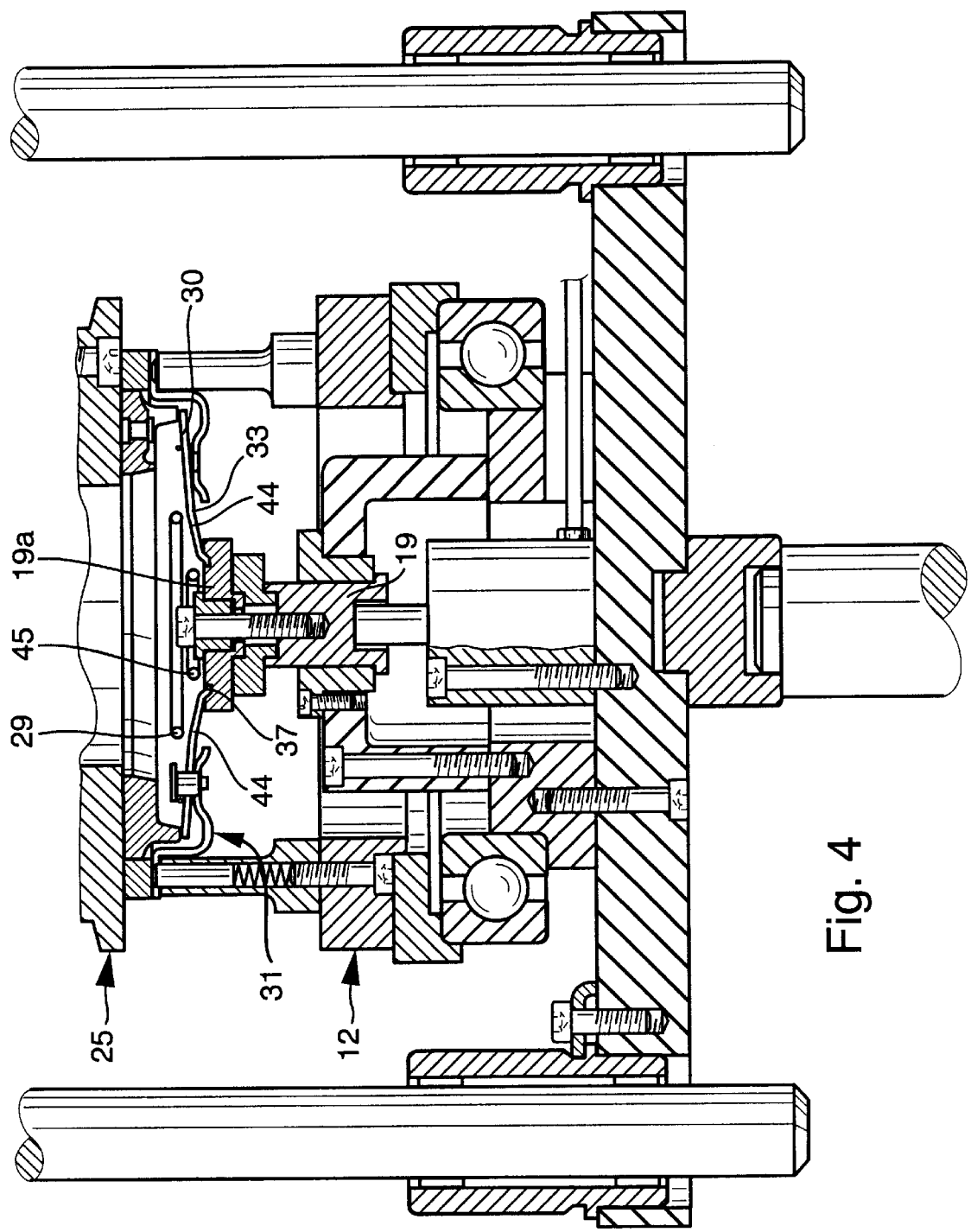

The end position of the device 1 required for aligning the height of the plate spring tongue tips 37 is shown in FIG. 4.

In this operating state of the friction clutch 31 the plate spring tongues 33 are pretensioned opposite the nominal measurement of the desired plate spring tongue height by a certain amount, namely by an amount which lies at about 1.5 mm. This amount can however also be selected greater or smaller. The pretension must however take place so that an alignment of the tongues is possible through breaking down the bending tensions introduced in same.

With the illustrated embodiment the socket device 12 and the support device 25 as already described in connection with FIG. 1 are brought to rotate by means of a drive 27 and 28 whereby at the same time, or shortly before or shortly after, the induction coil 29 is activated whereby the adjoining areas 44 of the plate spring tongues 33 are heated at least in the desired temperature which is preferably in the order of 850 degs. C. Through the heating the strength in the corresponding areas drops very sharply so that the sections of the tongues 33 located either side of these areas 44 can relax, namely practically completely. The height difference which may have originally existed between the individual tongue tips 37 is thereby compensated or reduced to an at least acceptable amount. After the areas 44 have been heated and the plate spring tongues 33 relaxed the areas 44 can be deliberately cooled down so that the areas 44 again harden. The cooling down of the areas 44 can be carried out for example by means of a turbine which is integrated directly in the device 1, e.g. in the area of the component parts which can be rotated by means of the drive 27+28. However a blower or turbine can also be provided which introduces cooling air for example through the opening 4$a$ in the area of the upper part 3.

In the illustrated embodiment the induction coil 29 is provided on the side of the plate spring 30 remote from the cover, but the coil 29 can however also be mounted on the other side of the plate spring 30 or one coil can be provided on each side of the plate spring 30.

With the procedure described above the plate spring tongues 33 are already pretensioned when starting the heating of the areas 44. According to another variation this pretension can however only arise during or shortly after the heating of the area 44. Depending on the timing of the biasing of the tongue tips 37 no or practically no elastic or resilient tensioning of the plate spring tongues 33 takes place since on reaching the ideal temperature in the areas 44 these only have a very slight or practically no more strength. A procedure of this kind can be achieved for example in that when starting the heating of the areas 44 the adjustment cylinder 18 or adjustment ram 19 is located in a retracted position and is only raised again into the position required for adjusting the tongue tips 37 after reaching or shortly before reaching the desired deformation temperature.

As soon as the adjustment process is completed the rotating parts are braked or brought to a standstill and the device 1 is opened so that the friction clutch 31 can be removed.

The radial area in which the sections 44 to be heated are located can be selected so that through the heating of these sections or areas 44 at least a partial settng of the plate spring 30 takes place at the same time. This setting is due to the fact that the heat introduced into the areas 44 acts at least on the inner edge area of the ring-shaped foundation body 32 of the plate spring 30. Thus with the method according to the invention a type of heat-setting of the plate springs can take place at the same time.

According to a variation or further development of the invention which is not shown a further induction coil can be provided in the device 1 and can be used to harden the plate spring tongue tips 37. With a hardening of this kind the plate spring tongue tips 37 are brought to a higher hardness than the hardness existing in the remaining areas of the plate spring 30. A coil of this kind is shown in FIG. 4 and marked by 45. The cooling down of the tongue tips can take place again by means of air or in another way (e.g. liquid cooling). The hardening of the tongue tips 37 can thereby take place at the same time as the heating and hardening of the areas 44 or however can take place just after or before. If with hardening of the tongue tips 37 the adjustment ram 19 adjoins the tongue tips 37 then it is particularly expedient if this adjustment ram 19 has at least a component part e.g. in the form of a disc 19a which consists of a non-conductive or non-magnetizable material such as e.g. a ceramic material. The material should thereby have a very low heat conductivity.

According to a variation of the method or invention the alignment of the tongues 33 relative to each other can also take place through corresponding configuration of the device 1 only on the diaphragm spring or plate spring 30 by itself.

Although the invention was described in connection with the description of the figures mainly in connection with a plate spring 30 where all the tongue tips 37 are brought at least approximately to the same axial height, the method according to the invention can also be used in the case of diaphragms where fingers or tongues are provided which have at least a different path over a part of their extension or their tongue tips have a different height, thus are off-set relative to each other. Diaphragm springs of this kind are known for example through DE OS 19524827, DE PS 3643781, DE OS 3528660, DE OS 351 3315 and DE OS 2460963.

Investigations carried out in connection with the invention have shown that the hardness of the plate spring tongues 33 in the inductively heated area 44 can be increased by sharp cooling down whereby a transition area can be produced with the remaining sections of the tongues 33 in which a drop in hardness is to be established.

Through the method according to the invention the individual tongue tips 37 can be brought into a height range with a band width of maximum ±0.3 mm in relation to the desired reference height. Experiments carried out in connection with the invention have shown that a band width of ±0.2 mm or even smaller can be maintained.

If the height difference or stagger which may possibly remain between the tongue tips 37 is very slight, e.g. in the order of 0.1 to 0.3 mm, according to a further development of the invention this stagger can be reduced at least further by mechanical finishing, such as e.g. by grinding the tongue tips 37. It is thereby ensured in the case of a friction clutch that during operation of the friction clutch a still more even introduction of the disengagement force by means of the tongues 33 into the ring-shaped foundation body 32 is guaranteed. Furthermore this is advantageous for the disengagement bearing of the disengagement member engaging on the tongue tips 37 which is required for operating the friction clutch 31, since the bearing is loaded more uniformly and thus practically no tilting forces act on the disengagement member.

Plate springs 30 with aligned tongue tips 37 can be used with particular advantage in connection with friction clutches which have adjustment means to compensate the wear on the friction linings. Friction clutches of this kind are known for example from DE OS 4239291, DE OS 4306505, DE OS 423 9289, DE OS 4322677 and DE OS 4412107.

With the embodiment described the device 1 is constructed so that the friction clutch or plate spring rotates at least during the heating of the corresponding tongue areas. The device 1 can however also be constructed so that with the corresponding heat treatment the clutch or plate spring does not turn and instead of this the coil 29 and/or the coil 45, thus the heating means, rotate.

When adjusting the tongues of the plate spring it is possible according to a further development according to the invention to fit a pressure member (such as is known for example through DE OS 34 24 227 and U.S. Pat. No. 2,835,366) or a disengagement bearing (such as is known for example through DE OS 23 27 937) on the tongue tips 37.

The invention is not restricted to the embodiments of the description. Rather numerous amendments and modifications are possible within the scope of the invention, particularly those variations, elements and combinations and/or materials which are inventive for example through combination or modification of individual features or elements or process steps contained in the drawings and described in connection with the general description and embodiments and claims and which through combinable features lead to a new subject or to new process steps or sequence of process steps insofar as these refer to manufacturing, test and work processes.

What is claimed is:

1. A method of adjusting a diaphragm spring having an axis of rotation defining an axial direction and fingers extending at least in part to an axial height, the method comprising the steps of:

heating at least one finger in a predetermined area located between predetermined sections of said finger, and bending said predetermined sections relative to each other so that said finger obtains a desired axial height.

2. The method of claim 1, wherein the bending step is performed first and elastic stresses thereby produced in the finger are at least reduced by the heating step.

3. The method according to claim 2, wherein the elastic stresses are substantially broken done by the heating step.

4. The method according to claim 1, further comprising the subsequent step of cooling down the heated area so that at least a partial hardening is produced in this area.

5. The method according to claim 1, wherein the diaphragm spring prior to the steps of heating and bending—except for a possible tempering of the diaphragm spring and further except for a possible hardening of the finger tips—has undergone final heat treatment with regard to its spring properties.

6. The method according to claim 1, wherein the heating step, the material strength is reduced to 0 N/mm$^2$ at least in parts of said predetermined area.

7. The method according to claim 1, wherein the diaphragm spring was radiated at least partially prior to the adjustment of the fingers.

8. The method according to claim 1, wherein at least a partial heat-setting of the diaphragm spring occurs through the heating step.

9. The method according to claim 1, wherein the diaphragm spring is formed by a plate spring with a ring-shaped foundation body serving as energy accumulator with a radially inner circumferential area and a radially outer circumferential area wherein the fingers extend in the form of tongues from at least one of the circumferential areas.

10. The method according to claim 9, wherein the plate spring is domed conically in the unstressed state and has radially inwardly pointing tongues which are separated from each other through radially aligned slits.

11. The method according to claim 1, wherein the steps of heating and deforming are performed jointly in all of the fingers.

12. The method according to claim 1, wherein the fingers have free end areas and through the adjustment step at least the free end areas come to lie at least approximately in a plane perpendicular to the axis of rotation.

13. The method according to claim 9 wherein the radially inwardly directed tongues have tongue tips that can be axially biased by an operating means whereby the tongue tips are brought at least approximately to the same axial height through the bending step.

14. The method according to claim 1, wherein in the heating step said predetermined area is heated to a temperature between 600 and 950 degrees Celsius.

15. The method according to claim 1, wherein the method is performed on the diaphragm spring by itself.

16. The method according to claim 1, wherein the method is performed on the diaphragm spring with the latter being in an installed state.

17. The method according to claim 16, wherein the method is performed on the diaphragm spring with the latter at least installed in the clutch housing.

18. The method according to claim 16, wherein the method is performed on the diaphragm spring with the latter installed in a finished assembled friction clutch.

19. The method according to claim 1, wherein said predetermined sections are at least approximately of equal length.

20. The method according to claim 1, wherein the heating step comprises inductive heating.

21. The method according to claim 20, wherein the inductive heating is carried out by means of at least one coil.

22. The method according to claim 21, wherein at least two coils are provided, at least one of the coils serving to perform the heating step, wherein further the fingers have free finger tips, and the method comprises the additional step of hardening the free finger tips by means of at least one other of said at least two coils.

23. A friction clutch comprising the diaphragm spring made by the method according to claim 1.

* * * * *